Patented Mar. 13, 1934

1,950,701

UNITED STATES PATENT OFFICE 1,950,701

METHOD OF TREATING SEEDS WITH A NUTRIENT SALT SOLUTION

Paul Spangenberg, Eisleben, Germany

No Drawing. Original application October 24, 1931, Serial No. 570,977. Divided and this application January 19, 1933, Serial No. 652,572. In Germany November 1, 1930

5 Claims. (Cl. 47—58)

This invention relates to a method of treating seeds with a nutrient salt solution for accelerating the germination and growth of seeds without earth. The character of the nutrient salt solution is described in my copending application Serial Number 570,977, filed October 24th, 1931, of which the present invention is a division.

The object of the invention of my said copending application is to provide a method for producing a nutrient salt solution by means of which the germination and growth of seeds without earth can be accelerated artificially to a much greater extent than has been possible till now, and the main feature of the invention is that nitrogenous inorganic substances and carbonaceous organic substances are mixed in watery solution with the addition of nitrogenous acids, such as nitric acid or nitrous acid. The chief constituents of the solution are unslaked lime, sugar, nitric acid, urea, and potassium phosphate, the lime serving particularly as fertilizer; the sugar being the carbon carrier for the cellular structure of the plant; and the nitric acid or urea transmitting the nitrogen.

The method of producing the nutritive mixture is explained by the following example: giving the constituents of the solution:

| | Grams |
|---|---|
| Lime | 100 |
| Sugar | 500 |
| Water | 200 |
| Potassium phosphate, preferably dibasic | 500 |
| Free nitric acid | 200 |
| Water | 500 |
| Urea | 100 |
| Boron | 2 |
| Water | 500 |

The first step consists in disintegrating the unslaked lime and mixing it with the sugar, whereupon 200 grams of water are slowly added to this mixture so as to slake the lime and cause the exothermic heat set free thereby to convert the sugar into caramel. The substance thus obtained is a pastelike or gelatinous mass in which no solid constituents should be found.

Then the nitric acid is added, and the considerable heat developed thereby causes the gelatinous mass to dissolve into a liquid to which the potassium phosphate is added, the addition of the latter constituent being preferably effected alternately with that of additional 500 grams of water before the solution has cooled down. By slow stirring the thick liquid can be kept in a softer condition, the 500 grams of water being added during the stirring or afterwards.

According to the purity of the lime, addition of more nitric acid up to 150 grams can take place to further the solubility of the lime. A larger portion of nitric acid will prevent the solution procured from this mixture with water for the treatment of the seeds from acquiring a slimy state so as to render subsequent rinsing of the germs or vegetable matter obtained unnecessary.

Urea and boron are added next, it being possible to substitute manganese for boron. In order to prevent subsequent hardening of the gelatinous paste, an additional quantity of 500 grams of water is added, or urea and boron may be dissolved first in a part of the remaining water and then added to the mixture. The jelly thus procured may be kept in suitable containers with the air excluded. For extended storing a preservative may be added. The nutrient salt solution resulting from the composition stated above is suited particularly for accelerating the germination and growth of maize, and the constituents of the composition may be varied for other kinds of seed. To illustrate the comprehensive character of the applicability of the invention, the examples stated below give the compositions for a few other seeds.

*Constituents of a solution for lupines*

| | Grams |
|---|---|
| Lime | 500 |
| Sugar | 200 |
| Nitric acid | 100 |
| Superphosphate | 1000 |
| Chlorate of manganese | 5 |
| Ammonium phosphate | 10 |
| Potassium phosphate | 50 |
| Albuminous substances soluble in water | 25 |
| Potassium silicofluoride | 5 |
| Water | 3000 |

*Constituents of a solution for soy beans*

Similar to the above.

*Constituents of a solution for oats*

| | Grams |
|---|---|
| Basic nitrate of lime | 1000 |
| Sugar | 400 |
| Nitric acid | 200 |
| Potassium chloride | 250 |
| Magnesium sulfate | 250 |
| Ferrous sulfate | 20 |
| Albuminous substances soluble in water | 15 |
| Water | 2000 |

*Constituents of a solution for rye*

| | Grams |
|---|---|
| Lime | 1000 |
| Sugar | 500 |
| Nitric acid | 100 |
| Calcium phosphate | 250 |
| Ammonium sulfate | 250 |
| Potassium chloride | 250 |
| Albuminous substances soluble in water | 15 |
| Potassium silicofluoride | 5 |
| Citric acid | 5 |
| Ferrous sulfate | 10 |
| Water | 2000 |

According to the invention, the processes of germination and growth can be aided by adding soluble decomposition products of albuminous substances of animal or vegetable origin to the inorganic nutrient salts. These products of decomposition are organic building elements for the cells of the plant. Artificially produced albuminous decomposition substances are also cell stimulants for artificially influencing growth. The albumen from which these decomposition products are procured may be obtained from meat, casein, lactalbumin or the like, or from oil-free plant seeds. For example, if lupine seed is to be cultivated, the albumen of the lupines is preferably decomposed, and the decomposition products are, dissolved in water, added to the inorganic salts. From the chemical point of view, the decomposition substances may range from peptone to amino acid. It has been found that certain medicinal chemicals, such as iodine in the form of potassium iodide, may be added to the solution without the least trouble and will be absorbed readily by the germinating plant within the nutrient substance described. This is quite important, as it will permit, by rapid artificial cultivation, the production of food plants for man or beast, which are of great value to the organism. The composition of the nutritive substance of the plant can be determined by a suitable composition of the nutrient solution. If vegetable fodder containing a very high percentage of phosphorus is to be produced, a considerable portion of potassium phosphate must be added during the preparation of the nutrient salt solution having the composition mentioned. If the fodder is to contain iron, an iron salt should be one of the constituents. In the same manner any possible harmful influence on the organism of man and animal can be prevented.

The object of the present invention is to use the nutrient substance in the following way:

The seed is placed in flat layers without earth in suitable containers, such as watertight boxes having a regulatable discharge outlet. To facilitate attendance and save space, the boxes may be combined into cabinets by being placed side by side or on top of one another. For watering the seed thus arranged 50 to 80 grams of the nutritive substance prepared are added to approximately 80 liters of water. The treatment should preferably be carried out while light and air are excluded. On the first day, watering with the solution stated should continue for about 10 hours. During the next few days irrigation should take place three times a day for about half an hour each. The boxes are preferably closed to prevent as much as possible the entrance of light and air. It will then be found that development of heat is an attendant phenomenon of growth, which, owing to its favorable effect, should not be interfered with by airing, as might happen during watering. The level of the solution within the boxes is chosen so that on the first day the seed layer is fully covered by the solution which during the following days should reach only up to the lower root of the seed. In the course of time the strength of the solution may be varied by concentration or dilution according to the nature of the seed and the purpose for which the product is to be used. If the seed is exposed for about 3 to 10 seconds prior the watering to radiation by means of quartz lamps for instance, conditions for rapid germination will be improved. To further the growth carbonaceous or nitrogenous gas may be introduced into the boxes.

Owing to the watering and other treatment described, effective germination of the seed and growth of the plant will take place in a surprisingly quick way. Out of a seed layer 4 to 7 centimeters high will come after about 8 days a layer having approximately a height of 40 centimeters, which consists of a firm mass of roots, blades or leaves grown together, so that it can be removed as a solid block from its container after the period of growth is over. It is a remarkable fact that the grain of the seed is retained and quite firm after the treatment. Therefore, the vegetable layer can be used in this condition, without requiring cleaning and without waste, as fodder for an animal, according to the seed employed for the germination and growth process. Experiments made with maize, cotton seed, lupines, common purple trefoil, soy beans and other seeds were very successful. The leafy portion can be removed from the seed and root portions and used in a suitable manner as raw diet for human beings. The invention is of very great importance for producing feeding stuff. Regardless of the time of the year, fresh green fodder will be available whenever desired, so that it becomes possible to dispense entirely with hay as fodder which readily gets moldy when stored and thus may cause disease. Furthermore, the feeding stuff may be selected with a view to feeding animals for the production of either meat or milk. The importance of the invention resides in the rapid cultivation of plants, particularly for obtaining green fodder at a season when nature does not offer it. By applying the invention fresh food and fodder can be produced within about 5 to 8 days without tilling the soil and without being dependent on more or less favorable weather conditions. Hospitals or dietetic establishments in particular will be capable of producing on their own premises for dietetic treatment fresh vegetable foodstuffs containing certain nutritive or curative substances, such as iodine, and will be able to control the process completely.

I claim:—

1. A method of treating seeds with a nutrient salt solution of the character described, which consists in placing the seed in a thin layer on the bottom of airtight and light-tight containers, covering the seed on the first day completely with a diluted nutrient salt solution and in reducing watering thereafter to make the solution come up only to the lower roots produced.

2. A method of treating seeds with a nutrient salt solution of the character described, which consists in placing the seed in a thin layer without earth on the bottom of suitable containers, covering the seed on the first day completely with a diluted nutrient salt solution for about ten hours and during the next days, when a development of heat is an attendant phenomenon of growth, irrigating three times a day for about half an hour each, in such a way that the solution comes up only to the lower roots, the containers not being interfered with by airing.

3. A method of treating seeds with a nutrient salt solution of the character described, which consists in exposing the seed to radiation prior to applying the solution.

4. A method of treating seeds as claimed in claim 1 with a nutrient salt solution of the character described, which consists in introducing carbonaceous or nitrogenous gas into the airtight containers.

5. A method of treating seeds as claimed in claim 2 with a nutrient salt solution of the character described, which consists in introducing carbonaceous or nitrogenous gas into the airtight containers.

PAUL SPANGENBERG.